U. BEEBE.
Seed-Planter.
No. 13,077. Patented June 19, 1855.
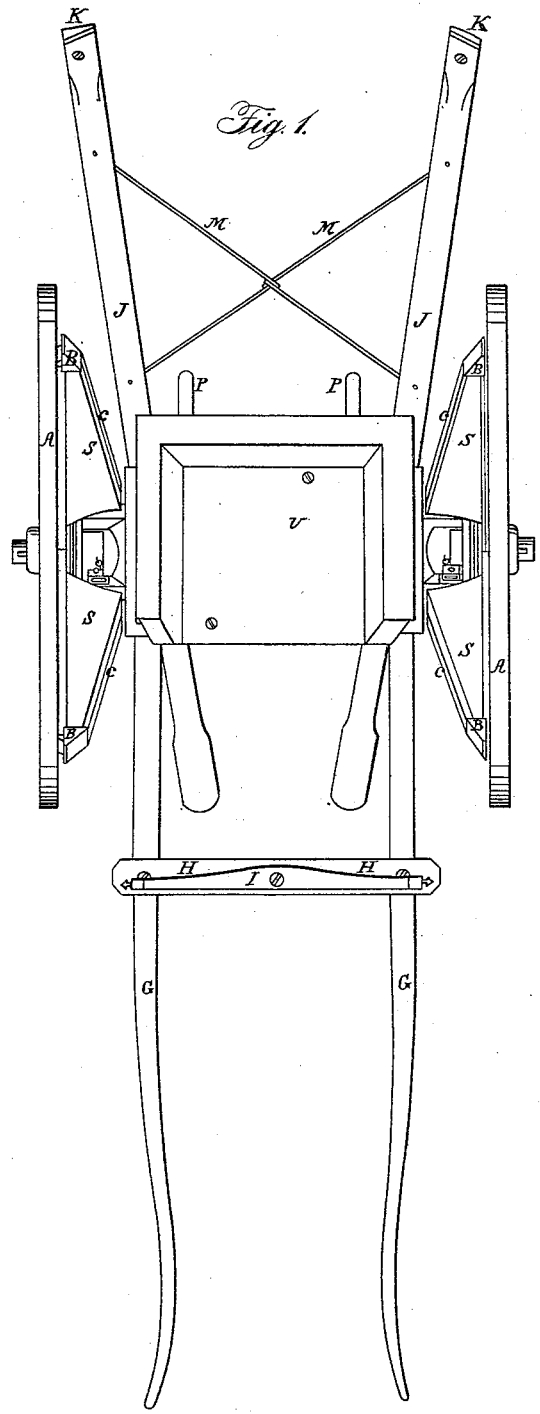
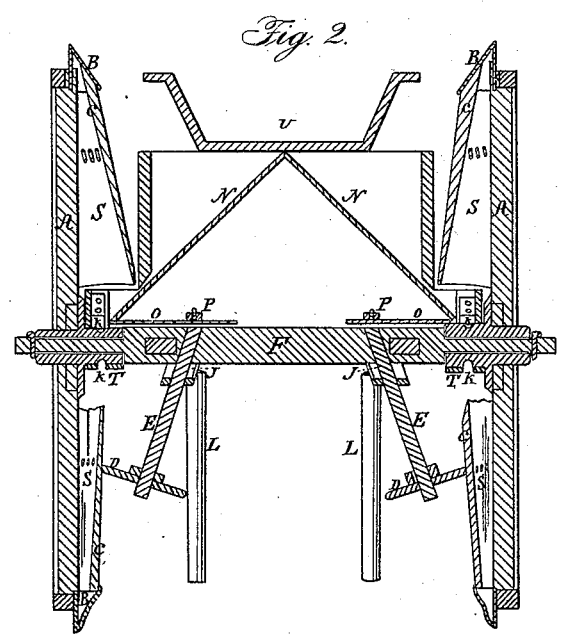

UNITED STATES PATENT OFFICE.

URIAH BEEBE, OF OAKLAND TOWNSHIP, OAKLAND COUNTY, MICHIGAN.

IMPROVEMENT IN CORN-PLANTERS.

Specification forming part of Letters Patent No. 13,077, dated June 19, 1855.

*To all whom it may concern:*

Be it known that I, URIAH BEEBE, of the township of Oakland, in the county of Oakland and State of Michigan, have invented a new and useful Machine for Planting Corn, called a "Double-Spade Corn-Planter."

The nature of my invention consists in a new and improved mode of planting in checkrows by means of shafts J and supports L attached to seed planters, which act as levers to raise the wheels to enable the driver while seated to adjust the planters, and which also act as coverers to complete the process of planting.

To enable others skilled in the art to make and use my invention, I do hereby declare that the following is a full, clear, and exact description of the construction and operation of the same, reference being had to the annexed drawings, making a part of this specification, in which—

Figure 1 is a perspective view, and Fig. 2 a cross-section through the center.

My machine is constructed with two wheels four feet and eight inches in diameter, geared to the axle-tree F, as represented by letter A in Figs. 1 and 2, each wheel having four spokes formed by halving together in the center two pieces, the extremities extending outward and halved onto the felly to connect with the planters B, eight in number, as seen in Figs. 1 and 2.

The planters B are formed of two pieces of iron or steel, one piece flat, six inches in length and four inches in width, and closing into the other half, which is constructed with a flange on each side to receive it, (see letter B in Figs. 1 and 2.)

To each planter is attached a rod or handle, (marked C in Figs. 1 and 2,) which opens the planters while in the ground and deposits the seed. These rods or handles are operated by two wheels (marked letters D in Fig. 2) affixed to the post or standard E, which is framed into the axle-tree F, as shown in Fig. 2. These wheels are ten inches in diameter.

Two thills are affixed to the axle-tree, (see letter G, Fig. 1,) one cross-bar, letter H, and one whiffletree, I, Fig. 1.

Two shafts, J, attached to standard or post E, as seen in Figs. 1 and 2, serve as handles to the hoes K in Fig. 1, which, dragging behind the machine, fill the holes made by the planters B, and cover the seed in the earth, the forward ends serving as levers to raise wheels A when required to adjust the planters. The two supports L, attached by staples to shafts J, forward of the axle-tree F, serve as fulcrums, as seen in Fig. 2. The two braces M, Fig. 1, retain the hoes K in their places.

One seed-box is divided into two sections by means of the two inclined planes N. The box is affixed to the upper side of the axle-tree, and at lower extremity extends over the holes R in the hubs, the upper portion of the box being cut down in size, so as to allow the rods or handles C to pass in their revolutions, as exhibited in Fig. 2.

The two slides O, Fig. 2, are attached to two handles, P, Figs. 1 and 2, and serve to shut off the feed, when required.

Four holes are made in each hub (see letter R) of the wheels A, of sufficient size to hold the seed for one hill, and corresponding with the planters B, Fig. 2.

Letter Q, Figs. 1 and 2, represents two brushes inside of the seed-box, the points resting on the hub, so as to sweep over the holes R, and give to each hole in the hubs an equal quantity of seed.

The seed is conducted from the holes R in the hubs to the planters by means of a tube made of cloth or other flexible material attached to the handles C and to the spokes of the wheels A. The seed is held in its proper place in these holes in the hubs until deposited in these tubes by means of a piece of leather (see letter T in Fig. 2) affixed to the seed-box, and passing around the under side of the hubs, a hole being made in these pieces of leather to allow the seed to escape on the under side only, where it drops into the tubes connecting with the planters.

U represents the driver's seat, Figs. 1 and 2.

To use the above-described machine, first draw across the field, on opposite sides, two parallel lines to start from alternately. Then place the machine with one planter of each wheel striking into the ground at either of these lines, hitch on the horse, fill the seed-box, and, mounting to the driver's seat, drive across the field. When arrived at the opposite side reach behind you and move the handles P from each other to shut off the feed, turn round, then back or drive forward to the proper distance from the inside row just planted. Then place your foot on the shaft J, raise one of the wheels A, turn it round with your hand until one of the planters strikes opposite the last hill planted on the inside row. Then serve the other wheel in the same way. Then move the handles P toward each other to let on the feed. You are then ready to start again, all of which is done with ease, accuracy, and dispatch. So continue until the field is planted and you have your corn planted in rows both ways three and one-half feet apart each way, if done with a machine of the size above described, so far as the face of the ground will permit, the irregularity, if any, arising from the unevenness of the ground.

What I claim as my invention, and desire to secure by Letters Patent, is—

The shafts J and supports L, combined, arranged, and operated in the manner and for the purposes set forth.

URIAH BEEBE.

Witnesses:
LORAN L. TREAT,
H. I. TREAT.